United States Patent [19]

Crow

[11] 4,454,510
[45] Jun. 12, 1984

[54] DISCRETE ADDRESS BEACON, NAVIGATION AND LANDING SYSTEM (DABNLS)

[76] Inventor: Robert P. Crow, 15464 Hamner Dr., Los Angeles, Calif. 90024

[21] Appl. No.: 246,174

[22] Filed: Mar. 23, 1981

Related U.S. Application Data

[63] Continuation-in-part of Ser. No. 970,756, Dec. 18, 1978, abandoned.

[51] Int. Cl.$^3$ .............................................. G01S 13/00
[52] U.S. Cl. ................................ 343/5 GC; 343/455; 343/456; 343/6.5 R; 343/5 LS
[58] Field of Search ................ 244/183; 364/439, 451, 364/429, 430, 424, 440, 441; 343/5 GC, 112 TC, 108 R, 6.5 R, 112 CA, 5 LS, 6.5 LC, 112 C, 455, 456, 399

[56] References Cited

U.S. PATENT DOCUMENTS

| | | | |
|---|---|---|---|
| 3,055,001 | 9/1962 | Ricketts | 343/6.5 R |
| 3,755,811 | 8/1973 | Breckman | 343/112 CA X |
| 3,775,767 | 11/1973 | Fielding | 343/6.5 R |
| 3,801,979 | 4/1974 | Chisholm | 343/112 CA X |
| 3,868,497 | 2/1975 | Vietor | 364/430 X |
| 4,060,805 | 11/1977 | McComas | 343/112 TC X |
| 4,128,839 | 12/1978 | McComas | 343/112 CA |
| 4,196,474 | 4/1980 | Buchanan et al. | 364/441 X |
| 4,218,679 | 8/1980 | Bohm et al. | 343/6.5 R |
| 4,274,096 | 6/1981 | Dennison | 343/112 TC |

*Primary Examiner*—Theodore M. Blum

*Attorney, Agent, or Firm*—Keith D. Beecher

[57] ABSTRACT

An aircraft surveillance, navigation, landing, guidance and collision avoidance system is provided which takes the form of a two-way data communication link between each of a plurality of controlled aircraft and a ground station, and appropriate measuring equipment at the ground station which provides three-dimensional position data on the ground for air traffic control purposes; and which also provides three-dimensional position data in the aircraft for navigation, landing guidance and collision avoidance purposes, as well as a two-way air/ground data link for miscellaneous data and control purposes. The system of the invention comprises the combination of a ground transmitter/receiver station and airborne transponders mounted in the aircraft. The ground transmitter broadcasts discrete aircraft addressed interrogation pulses which are coded to contain position and/or other data. The transponders in all aircraft receive and decode the interrogation pulses, and the discretely addressed aircraft transmits appropriately timed reply pulses to the ground receiver which contain altitude and other data. Other aircraft utilize the received position information for collision avoidance purposes. The ground receiver measures the incident angles of the reply signal pulses and their precise time delays with respect to the interrogation pulses, so as to provide aircraft position and other data to the ground station, and to provide additional data for transmission to the aircraft on the following interrogation pulses.

26 Claims, 9 Drawing Figures

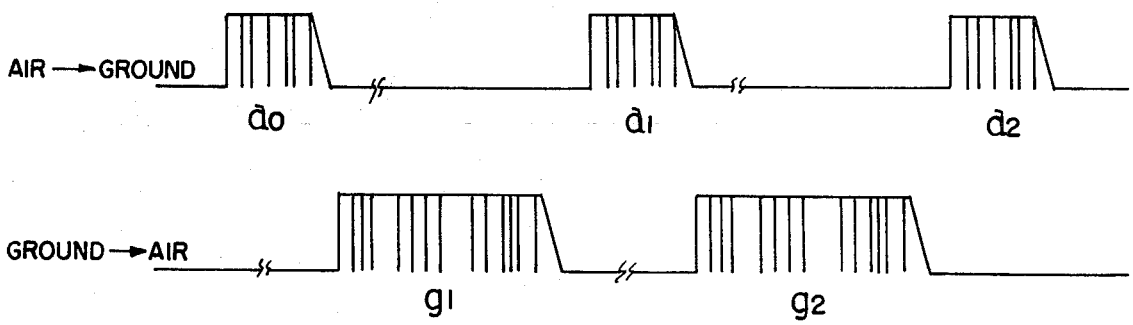

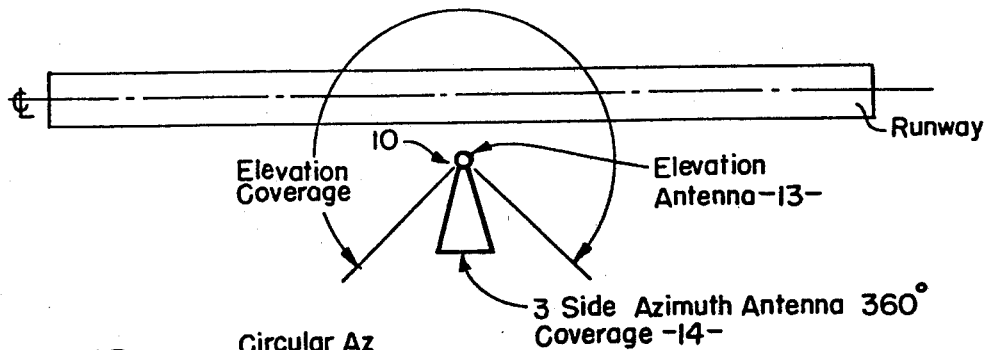
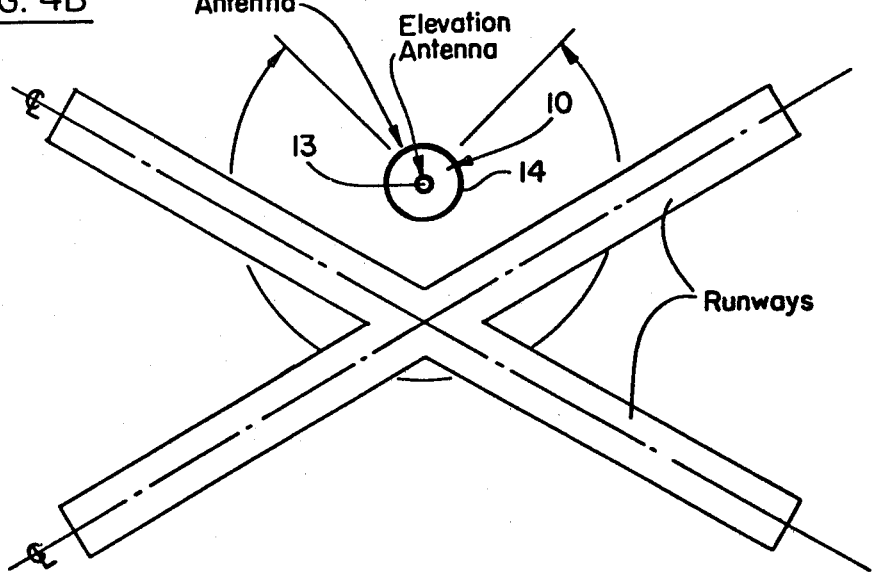
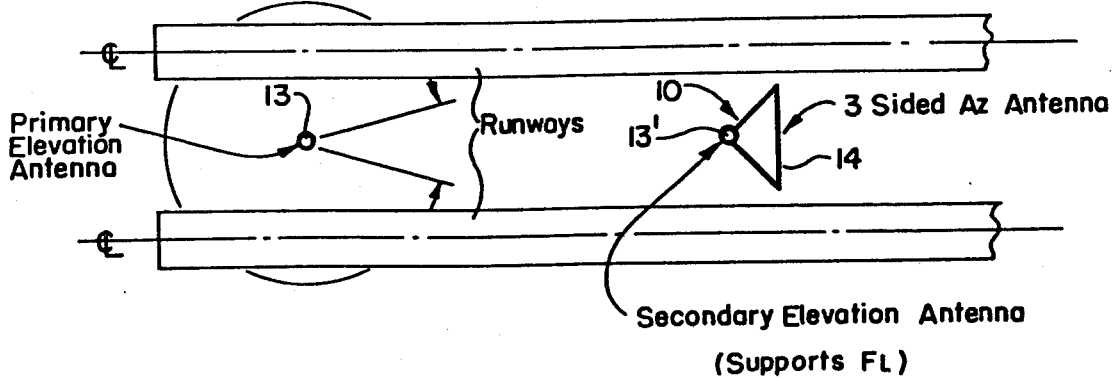

DISCRETE ADDRESS BEACON, NAVIGATION AND LANDING SYSTEM (DABNLS)

This application is a continuation-in-part of Ser. No. 970,756 filed Dec. 18, 1978 now abandoned.

BACKGROUND

There has been a proliferation and overlapping in recent years of different types of relatively complex aircraft radio navigation systems, and this proliferation has lead to excessive costs in the aircraft as well as the ground stations. Also, the present and developmental landing guidance systems lack versatility and capabilities needed in coming decades. Furthermore, there is pressing need for an improved air traffic control system, in particular the inclusion in such a system of an effective collision avoidance system. There is a need, therefore, for a relatively simple and relatively inexpensive system which is capable of performing all these required functions. The system of the present invention answers these requirements, and is capable of providing, for example, the following functions:

1. Discretely addressed air traffic control (ATC) surveillance;
2. Precise terminal and enroute area navigation with accuracies more than an order-of-magnitude better than the conventional VORTAC system, including pilot selectable automatic Standard Terminal Area Route and Standard Instrument Departure guidance in the terminal areas;
3. Precise distances for landing guidance;
4. Precise landing guidance, including automatic flare guidance, which is not accomplishable with existing microwave landing systems (MLS);
5. A single ground facility capable of providing multi-runway guidance;
6. A high speed two-way data link;
7. Collision warning/avoidance data provided at a high continuous rate in terms of traffic positions for pilot display/avoidance and/or ground-computed escape maneuvers, including accuracies adequate for horizontal as well as vertical escape maneuvers; and
8. With auxiliary programming, an automatic airport terminal in lieu of a manned control tower.

The system of the invention includes a series of ground stations located at the various airport terminals, and at selected points along the various aircraft routes. Vertical guidance and associated coding are included only in the terminal facilities. Thus, a typical airport terminal facility incorporating the concepts of the present invention is capable of accomplishing the functions of an ATC surveillance interrogator, a VOR/DME, and an instrument landing system (ILS), with greater capabilities than any of the prior art systems.

The DABNLS is a multi-phase coded pulse system, and the system utilizes steeply rising leading edges for the pulses to permit precise timing for precise distance measurements. The system of the invention also includes computational facilities at the ground station which provide position coordinates (latitude and longitude) and also off-set course deviation and distance data transmitted to the aircraft for area navigation guidance.

The computational facilities of the ground stations of the system of the invention at the various terminals also provide three-dimensional position off-sets for landing guidance of the aircraft to multiple runways of the airport. The computational facilities serve to provide horizontal and vertical "course softening" off-sets as the aircraft approaches the runway. The computation facilities also provide automatic flare guidance to the aircraft, utilizing wheel-to-antenna height and other data received from the requesting aircraft.

The ground stations also include an air traffic control surveillance function which utilizes the discretely addressed omni-directionally transmitted interrogation pulses, and an interferometer receiving antenna sub-system for determining the aircraft bearing from the reply pulses, the combination providing more flexible aircraft interrogation scheduling, higher continuous replay rate, and more effective reflection suppression than is possible with the scanning beam and complex reflection suppression networks used in present-day radar beacon systems.

BRIEF DESCRIPTION OF THE DRAWINGS

FIG. 2 is a series of waves illustrating the interrogation and reply pulse sequence between the ground station and the aircraft;

FIG. 3A is a series of tables representing the coding used in the ground-air interrogation pulses;

FIG. 3B is a series of tables showing the coding used in the air-to-ground pulses;

FIGS. 4A, 4B and 4C are representations of possible ground station locations at the various terminals;

DETAILED DESCRIPTION OF THE ILLUSTRATED EMBODIMENT

Technological advances in the field of air navigation and related fields in recent years have resulted in the development of the Microwave Landing System (MLS) and of the Discrete Address Beacon System (DABS). The system of the present invention represents an additional advance over the aforesaid prior art systems. Specifically, the system of the present invention extends the air traffic control capabilities of the developmental Discrete Address Beacon System to include a precise navigational function, a landing guidance capability, a collision warning capability, and other capabilities all of which are combined in a single system thereby obviating the need for a multiplicity of different systems and units to achieve such functions and capabilities.

The Discrete Address Beacon Navigation and Landing system of the invention is a ground-derived system which has an advantage over primarily air-derived systems. This is because processing of the flight position data for all the aircraft can be easily and reliably accomplished in one ground-based computer instead of in many airborne computers. In addition to the obvious economic advantage, more complex processing can be carried out in the ground-based computer, as compared with the airborne computer, without any encumbrances as to weight, size or cost restrictions. Also, there are economic and other advantages to be obtained from a ground-derived system, as compared with an air-derived system, insofar as landing of the aircraft is concerned.

A summary of the operational functions of the system, as set forth above are as follows: (a) discretely addressed air traffic control surveillance; (b) precise area navigation; (c) high speed two-way air-ground data link; (d) precise collision warning/avoidance data in the aircraft, as well as on the ground; (e) precise approach and landing guidance, including automatic flare guidance; (f) precise terminal area navigation, including automatic approach and departure waypoint and course sequences; and (g) auxiliary data, variable and fixed, including latitude-longitude and related facility and/or runway data.

The system of the invention can utilize existing L-band DME/TACAN channels with a form of pulse coding to be described, which provides operation of the system and of existing DME service with acceptably low mutual interference effect.

Figure 1:
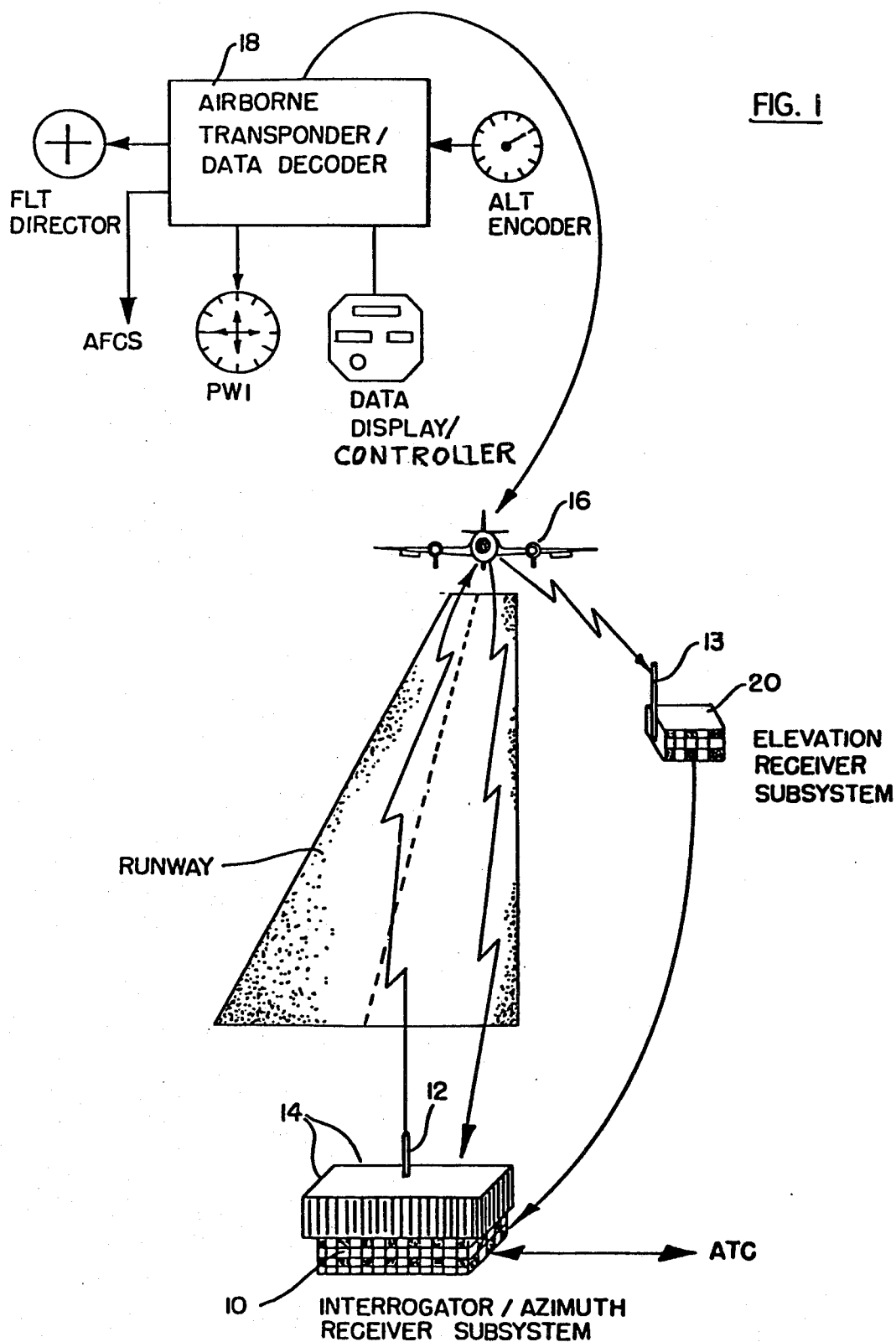
FIG. 1 is a schematic representation of a ground and airborne facility for operation in an airport terminal area in accordance with the concepts of the present invention.

A pictorial sketch of one system form of the invention for airport operation is shown in FIG. 1. The integrated interrogator/azimuth ground facility is designated 10. The particular facility includes an omni-directional transmitting antenna 12 and a four-sided interferometer azimuth receiving antenna array 14. Also illustrated in FIG. 1 is an aircraft 16 with its transponder 18 and associated displays and inputs and outputs.

Figure 5:
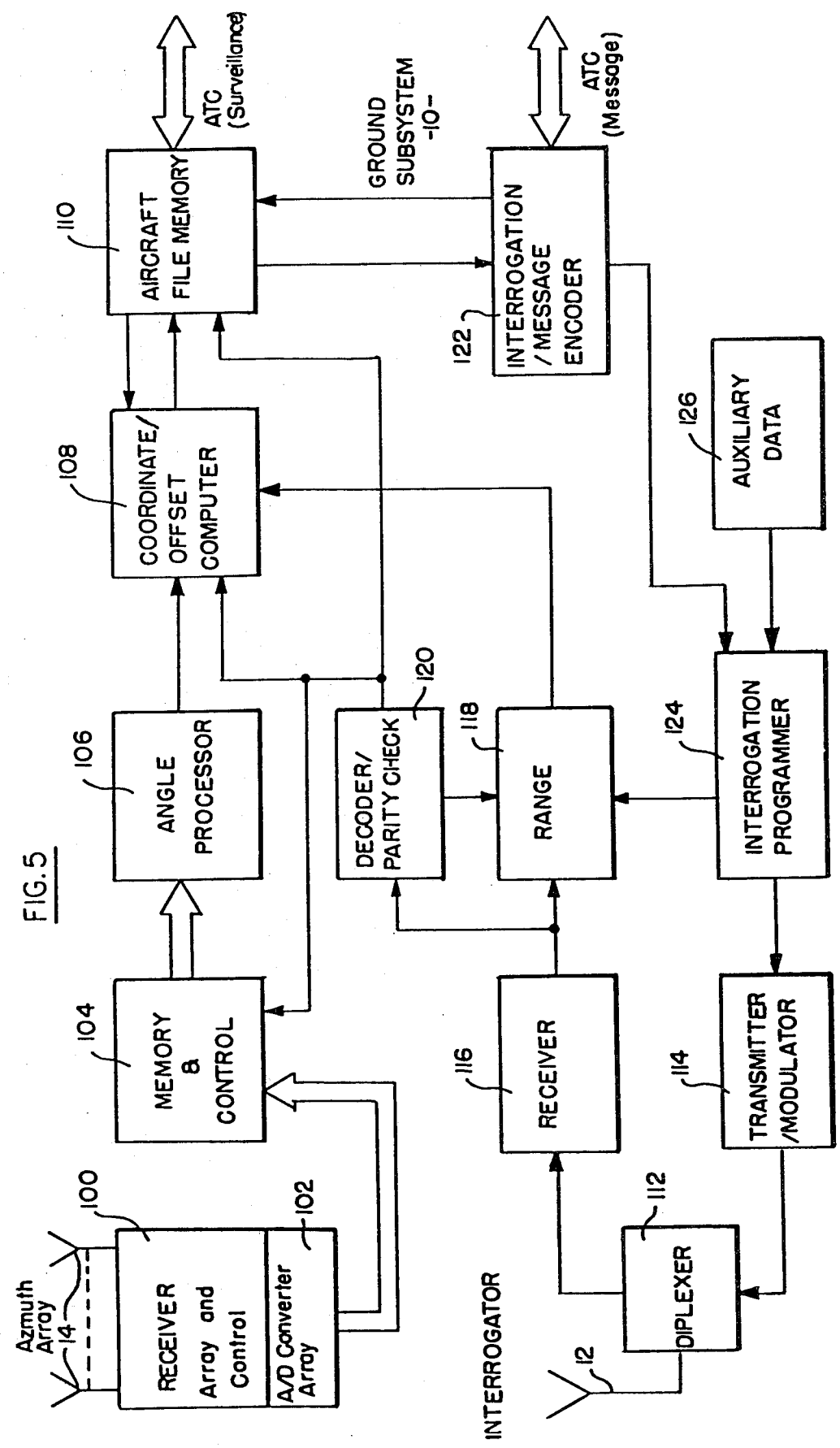
FIG. 5 is a ground station functional block diagram for the system of the invention.

The interrogator/azimuth ground station 10 includes an interrogator transmitter, shown in block diagram form in FIG. 5, which is connected to the omni-directional antenna 12, and an associated receiver and signal processor array which is also shown in FIG. 5, and which is connected to the receiver antenna array 14. The ground station also includes an azimuth angle and processing computer, an encoder, a decoder, a range timer, a target aircraft file, an interrogation programmer, auxiliary data and monitoring equipment, and aircraft traffic control interfacing equipment, as will be described. In the particular sketch of FIG. 1, the particular ground station is an airport ground station, and is located in a position off the roll-out end of the runway. An elevation angle and flare measuring station 20 is also positioned adjacent to the runway. The arrangement of the ground equipment in FIG. 1 is typical of a conventional landing system; however, as will be described later, the elevation facility (13,20) and the interrogator/azimuth facility can be combined and placed at other more convenient locations.

The sequence of transactions between the ground and airborne units may best be understood by reference to FIG. 2. The ground interrogator transmits omni-directionally a discretely addressed code to a specific aircraft by means of a biphase coded pulse ($g_1$). The addressed aircraft receives, decodes and precisely times a similar phase-coded reply pulse ($a_1$) with its discrete address and altitude. This air-to-ground reply pulse is received at the ground station, and the following steps are taken: (a) precise pulse leading edge timing is accomplished for the range measurement; (b) the amplitude and relative phase of the signal received by the azimuth antenna array elements 14 are measured at a specific time related point on the early portion of the pulse; (c) decoding of the aircraft identity and altitude is carried out and suitably sorted, and the identity decoding is used in part to match the interrogation and reply pulses and their timing and angular measurements; (d) the signal received by the antenna ray 14 is processed to determine the azimuth angle of the incident wavefront, including algorithms for multi-path effects reduction; (e) the azimuth and range data are added to the reported aircraft altitude, and the slant-range correction and any off-sets or other derived data are computed; (f) the data is transferred to the air traffic control system for display and other purposes, and the data is also stored in the target aircraft file; (g) the interrogation programmer, in the meantime, chooses succeeding aircraft from the target aircraft file and interrogates them, reserving only those periods of expected replies which are known from previous range measurements; (h) the position coordinates, altitude and/or other data for the aircraft of concern is encoded, and this data is included as part of the next interrogation pulse ($g_2$); (i) the aircraft receives and decodes the data, providing it, and other aircraft in the area receiving it, with precise three-dimensional position and guidance information, and the aircraft then replies with pulse ($a_2$); (j) range, course/centerline deviation, glideslope deviation and altitude or flare height data is encoded for the aircraft of concern for landing operations, and is included as part of the interrogation pulse ($g_2$); (k) other than the addressed aircraft receive interrogation pulse ($g_2$), and subsequent pulses, and utilize the altitude and position information, as well as their known position and altitude, to determine whether there is any collision threat, and if required, any escape maneuvers.

Figure 6:
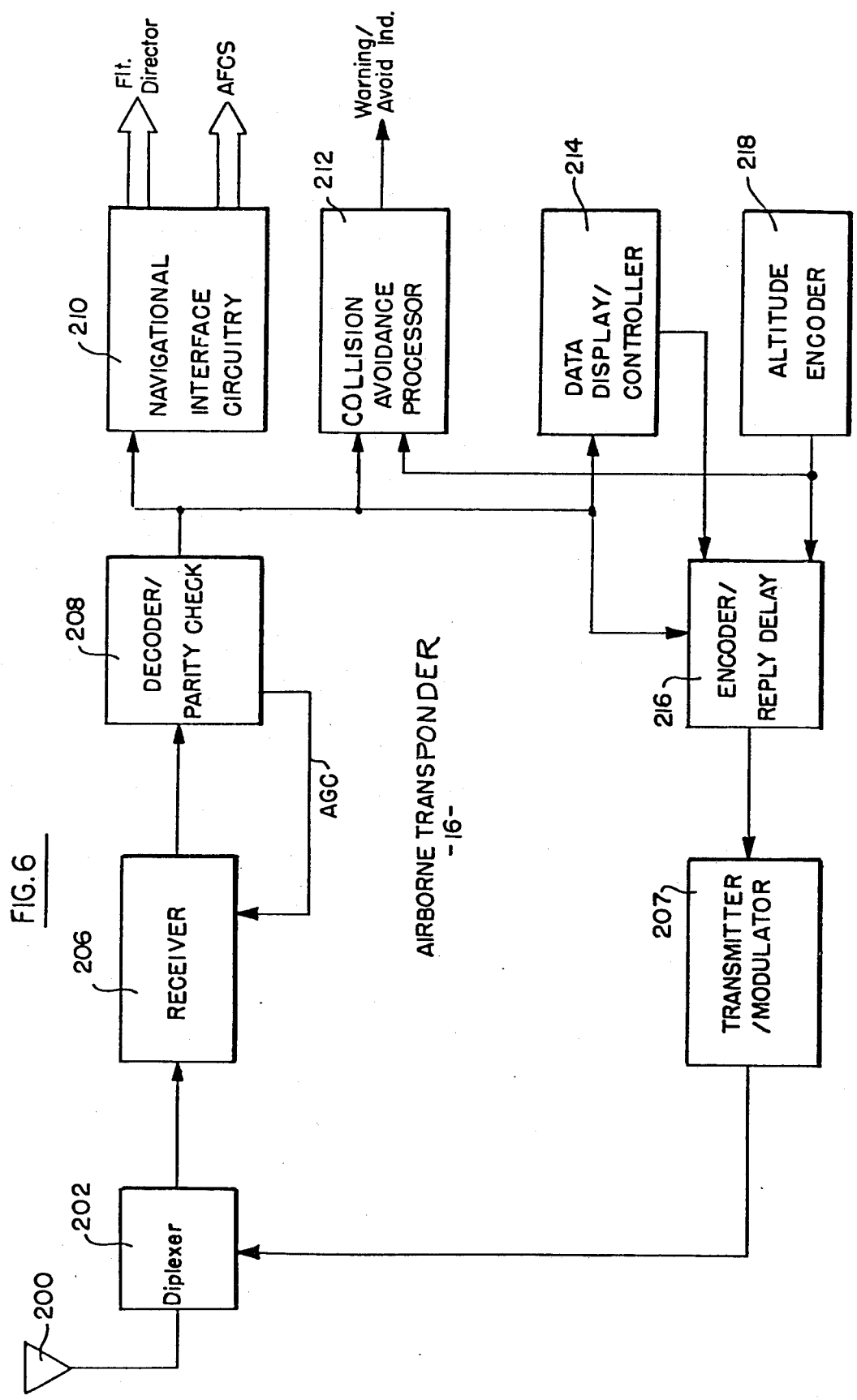
FIG. 6 is an airborne transponder block diagram in the system of the invention.

When the aircraft 16 first selects a ground station 10, or loses the signal from the ground station, the airborne unit, which is shown in FIG. 6, begins transmitting an identification pulse at a low rate of about one per second. The identification pulse includes the identity and altitude of the aircraft, and is represented in FIG. 2 by pulse ($a_0$). The ground station receives, decodes, and files this data for subsequent discretely addressed ground interrogations. These airborne transmissions can also be used in weak or no ground station signal regions for alternate collision avoidance purposes, as will be described.

Auxiliary data is transmitted from the ground station of FIG. 1 to the aircraft on separate non-discretely addressed, but identified data pulses. These latter pulses fill in between interrogations, and are similar to pulses used in conventional distance measuring equipment in that they are present even with little or no aircraft traffic, thus maintaining the automatic gain control for the aircraft receiver. A capacity in the order of 5000 data bits per second can be provided with little effect on aircraft capacity, which is more than adequate for the intended purpose.

In addition to the facility indentification, the auxiliary data may include: (a) latitude and longitude of the ground station; (b) compass variations to permit conversion of compass courses to true courses for correlation with latitude/longitude based navigation: (c) station elevation above sea level to permit slant range correction, if not accomplished by the ground facility; (d) standard approach and departure way-point coordinate sequences for automatic insertion into area navigation equipment, so as to reduce pilot workload with the simple selection of a sequence, and essentially eliminate the need for curve approach path computers, for landing purposes. A substantial quantity of variable meterological data can also be provided, if desired.

One of the techniques that enchances the operational and functional performance of the system of the invention is the use of discrete aircraft addressing for both interrogations and replies, with the exception of the auxiliary data. The discretely addressed ground interrogations of the various aircraft are sequenced, using range data on each, so that overlapping replies will never occur. The only exception is the initial aircraft identification pulse Ao, described above, but the rate is so low that the probability of overlapping a given reply is insignificant. The discrete addressing eliminates the need for tracking gates and associated complex circuitry. It also eliminates the ambiguities of random false replies, the need for beamed interrogations (in conjunction with measurement of wavefront incident angles), and the side lobe suppression system associated with beamed interrogations. Such a system permits a reduction in the total number of interrogations and replies and, hence, interference effects. Moreover, the system of the invention provides a means for more efficient data error detection and correction, and a simpler and more effective way for aircraft sorting of collision avoidance data. Only one basic mode of operation is used, but a number of different interrogations and replies can be utilized, essentially all automatically.

The pulse format chosen for the system, both for the interrogations, and for the replies is a single bi-phase-coded pulse. This method of coding is also differential phase shift keying, and it appears to be the most efficient for the present application. The theory has been well developed in the prior art and is described, for example, in Section 14-40 to 49, "Electronic Engineers Handbook", D. G. Fink, Editor-in-Chief, McGraw-Hill Book Company. Moreover, the techniques involved are well known, and are described, for example, in "Analysis and Experimentation on Lx-Band for MLS", dated July 1975 by I.T.T. Avionics Division, Vitrolab, Contract No. VL-SC-1155; and in "Microwave Landing System", Phase II, Oct. 1, 1974, I.T.T. Gilfillan/Honeywell, Contract No. DOT-FA72WA-2805. It should be noted that the purpose of the phase coding is data transmission, and not pulse compression, correlation gain, or other related performance improvements.

The phase-coded pulse in the system of the invention is divided into segments of opposite radio frequency phase commonly called "chips", with each chip being equivalent to a binary bit in one sense. With differential phase shift keying a radio frequency phase reversal at the beginning of a chip interval represents a binary "1", whereas no phase reversal represents a binary "0". The length of the chip is a major factor in determining the radio frequency spectrum of the pulse, as well as pulse length. Therefore, on-and-off channel interference effects are related to the chip length. A tentative choice of chip length for the system is 1.25 microseconds, which gives a 50 microsecond pulse with 40 chips, or bits. The optimum choice provides a balance between two factors: (a) short chip lengths have greater spectrum spreading and potentially increase the off-channel interference effects, (b) long chips lengths increase the pulse length and increase the potential on-channel interference effects of coincident pulse garbling. Longer chip lengths also decrease the channel capacity.

A number of interrogation and reply coding systems are possible, and one is shown in FIGS. 3A and 3B which illustrate the capability of meeting the basic requirements of the system. The first two ground-to-air pulse code formats (A and B) shown in FIG. 3A are the basic enroute interrogations. Format (D) is a basic airport terminal interrogation. A synchronization preamble provides the differential phase shift keying decoder synchronization and timing reference for the succeeding data frame at the sync phase reversal 0. This preamble is common to all ground-to-air and air-to-ground pulses, as shown in FIGS. 3A and 3B. The numbers shown on the pulses in FIGS. 3A and 3B are chip, or bit, numbers, with 81 bits being equal, for example, to 101.25 microseconds.

The "function" subframe (5 bits) of the pulses of FIGS. 3A and 3B indicate the type or purpose of the pulse, for example, whether it is a conventional interrogation, or reply, or auxiliary data pulse, and so on. The "channel facility" subframe (4 bits) provides a degree of radio frequency channel identification, channel multiplexing, or even runway identification. For example, of two co-channel facilities were so located that it may be possible for interrogations of both to be received, the channel identification code would prevent any false decoding or unintended communications.

The "discrete address/parity" subframe (24 bits) provides the basic aircraft addressing for interrogations and replies. It also includes a parity bit overlay for error detection and correction. That is, the 24-bit discrete address is overlayed with a 24-bit parity check, and summed bit-by-bit according to modulo-2, which is generated from the remaining portion of the pulse transmission. Therefore, an error occurring anywhere in the reception of an interrogation or reply will modify the decoded address. On the ground-air link the transponder decoder will not recognize the erroneous address and will not reply. With no reply, the ground station 10 will reinterrogate. On the air-ground link the interrogator will recognize that an error has been committed, in that it does not receive the expected address. In the latter case a limited amount of error correction can be accomplished. If errors cannot be corrected, the aircraft is reinterrogated. The 24-bit aircraft address code is adequate for the complete aircraft registration number, or other designators used by air carriers or by military aircraft.

The "distance" subframe (18 bits) provides slant range corrected distance of the aircraft from a selected waypoint or the ground station. The 18 bits can provide a 60 foot resolution out to 400 miles with a binary coded decimal format. For terminal area facilities, the range and resolution figures are reduced by a factor of 10.

The "latitude-longitude" subframe utilizes the universal position coordinates of the aircraft, using 36 bits. One-second resolution (approximately 100 feet) is provided. The tens and hundreds of degrees and direction (N, E, S, W) are obtained from the auxiliary data of the ground facility. This subframe alternates with the "distance", "course" and "course deviation" subframes, the three having the same 36 bits total.

The "course" subframe provides the aircraft selected course angle (0°-360°), if any, referenced to magnetic north. The 10 bits will provide a 1° resolution with a BCD format.

The "course deviation" subframe will provide data of the aircraft's deviation from any selected course to a waypoint. Eight bits are used, one for left-right, and the remaining bits for lineal deviation magnitude. This and the two preceding subframes are utilized on alternate interrogations with the "latitude-longitude" subframe, but only during navigation to a selected waypoint.

The "altitude/flare height" subframe (11 bits) ("flare height" exists in terminal area facility format only) has a dual purpose. It provides pressure altitude, as reported by the aircraft in the previous reply. This "echoed" altitude is of value to the pilot as a means for monitoring his reporting altimeter. However, more importantly, it provides other nearby aircraft with altitude for collision warning purposes. The 11 bits provide the standard ICAO code with 100 feet increments. Whenever the aircraft is at lower altitudes than 400 feet above the runway, the ground-computed height above the runway touchdown area will be reported. The 11 bits of the subframe provide a resolution of 0.25 feet with binary coded data coding on flare height, and the standard code of 100 feet increments is used at higher altitudes. The transfer from reported altitude to measured flare height takes place when the measured flare height decreases to 399 feet, for example.

The "center line deviation" subframe provides both angular and lineal aircraft deviations from the runway centerline, utilizing eight bits, one for direction and seven for deviation. At longer distances, angular deviations will be transmitted to the aircraft, comparable to the present ILS localizer deviations. Near the runway threshold, where the full-scale angular deviation becomes approximately 150 feet, the transmission to the aircraft would be converted to lineal deviations with a fixed full-scale of 150 feet.

The "glideslope deviation" subframe provides both angular and lineal aircraft deviations from the selected glideslope angle, utilizing eight bits, one for direction and seven for deviation. At longer distances, angular deviations, comparable to present ILS glideslope deviations, will be transmitted to the aircraft. Near the runway threshold, where the full-scale angular deviation becomes approximately 50 feet, the transmissions to the aircraft would be converted to lineal deviations with a fixed full-scale of 50 feet.

The second type of ground interrogation (C) shown in FIG. 3A provides 48 bits of messages, instructions, or commands in lieu of the position data. The remainder of the pulse format is identical to the first type except the appropriate code change in the function subframe. The third type of interogation (E) is actually a data pulse and serves the purpose of transmitting 72 bits of auxiliary data, including parity bits, as shown. This third pulse is addressed to all aircraft by the function code and, therefore, has no discrete address.

The air-to-ground reply pulse (A) of FIG. 3B is similar to the interrogation format except a 41 bit (51 microsecond) pulse is used instead of an 81 bit pulse. The synchronization, function, and discrete address/parity subframes are the same as with the interrogation pulses A through D but with the reply function code. Altitude is reported in the altitude frame (11 bits) with the standard ICAO code.

The second type of air-to-ground reply pulse (B) of FIG. 3B is for air initiated messages or an emergency, where altitude data is replaced as shown. An extended message frame can also be provided, as shown. This second type of reply is also used for acknowledgment of ground instructions or information.

The third type of air-ground reply could also be used which is identical in format to the first (A), but with a change in function code to indicate that it is an interrogation. The third pulse may be used for initial contact with a ground station to provide the aircraft's identity, and also for out-of-range collision warnings to be described subsequently.

The combination of discrete addressing and omnidirectionally radiated interrogations, as described above, provides a means for continuous air traffic control data, instead of bursts of data every 4 to 15 seconds, as is the case with the present scanning beam air traffic control surveillance systems. An interrogation rate of three per second then, is more than adequate for the aircraft traffic control function. Such an interrogation rate is also adequate for enroute navigation when it is considered that typical output filter time constants for present-day enroute VOR beacon systems are 2-3 seconds.

An interrogation rate of 5 per second is also adequate for the landing system function when it is considered that the maximum filtered rate output for the presently used system is of the order of 4 radians/seconds (0.64 Hz). It is noted that many DME interrogators in recent years have reduced their tracking rates from 30 ppps to 10-12 ppps, and further reductions appear to be practical. However, for the final approach and landing, starting, for example, 5 miles from the runway threshold, the interrogation and reply rates may be increased by the ground station to about 50 per second. These rates would keep the total traffic low, and yet have more than adequate rate for residual multi-path or noise averaging during the last critical part of the approach. Ground monitoring of the approach is also enhanced during this period. Interrogation spacing is preferably quasirandom in order to prevent loss of multi-path motion averaging at multiples of any fixed rate.

As described briefly above, the aircraft azimuth angle is determined by measuring the incident angle of the aircraft reply pulse wavefront impinging on the horizontal antenna array 14, using interferometer techniques. The horizontal array 14, normally providing 360° azimuth coverage, typically consists of a circular, or a three or four-sided linear array as shown in FIG. 1. Interferometer techniques per se are well known, and recent applications of these techniques to aircraft navigation are reported, for example, in a report from the Massachusetts Institute of Technology Lincoln Laboratory resulting from an FAA contract entitled "Experimental Validation of PALM . . . A System For Precise Aircraft Location", dated Apr. 29, 1975; and in an MLS proposal to the ICAO by the Federal Republic of Germany entitled "DME-Based Landing System (DLS)", dated September 1975. The systems described in the report and proposal use similar techniques and confirm the degree of performance that can be expected.

Both of the systems described in the foregoing report and proposal operate at L-band, the band proposed for the system of the present invention. The PALM system has a vertical elevation array with an overall of height of 30 feet. The DLS system uses both linear and circular horizontal azimuth arrays, and a linear elevation array.

One of the unique advantages of using the interferometer technique for angle measurements is the ability to ground process the sampled and digitally converted data from the array elements in various ways to obtain substantial improvements in accuracy, in particular with respect to multi-path effects. The sampled data can be combined in groups in such a way, for example, to provide virtual beams for the pre-final angular computation. It is also possible to null-out the effects of one or even more multi-path sources. This is all possible with ground station software, with no increase in complexity or changes in ground or airborne hardware.

The system of the invention also has another substantial multi-path discriminating means, which is that of time delay. By making the interferometer amplitude/phase measurements early after the initial pulse rise, reflected signals arriving later will have no effect. This means that reflections from all sources outside an ellipse formed with the foci at the aircraft and the ground station will have no effect. This relation is applicable both horizontally and vertically. In the case of the system of the invention, it has been initially estimated that with an initial reply pulse rise of 60 nanoseconds, a dual adaptive receiver bandwidth arrangement, and other related factors, the angle sampling can be completed at about 150 nanoseconds from the initial pulse rise. Thus, reflected signals with paths approximately 150 feet and greater than the direct path will have no effect on the measurement accuracy.

The precise distance measurements of which the system of the invention is capable are made with known and proven techniques. Precise timing of both the interrogation and reply pulses is accomplished on the relatively sharp-rising (60 nanoseconds) leading edge, typically at the 50% point, thus giving good discrimination against even relatively short delay multipath echos. The "delay and compare" type of timing threshold circuit used in the receiver of the system also provides protection against multi-path errors, in particular for the airborne transponders where related automatic gain control effects can cause timing errors. The range sub-system of the invention, therefore, is more than adequate for enroute and terminal area navigation, and is also adequate for precise landing guidance.

A basic advantage of the ground-based measuring system of the invention is that there is a far greater freedom in ground site locations as compared to present-day ILS and microwave landing systems. For example, the interrogator/azimuth site can be off-set from the runway centerline, as shown in FIG. 1, in order to eliminate the propagational effect of approach lights, instrument landing system localizer antennas, jet blast fences, and adverse terrain. The off-set distance error can be easily corrected by ground computation prior to transmission to the aircraft. Similar computational corrections make possible the offsetting of the elevation site 20 (FIG. 1) along the runway from the glideslope intercept point. In fact, it is possible with such computed off-setting to combine the two site facilities (10 and 20 and associated antennas) at a convenient location to the side of the runway.

FIGS. 4A, 4B and 4C illustrate three possible arrangements for obtaining multi-runway use from integrated common site facilities, as described briefly above, thus providing a considerable equipment saving which is not possible with existing landing guidance systems such as ILS and MLS. It is apparent that integration of the interrogator/azimuth facility 10 and the elevation facility 20 at a location near the middle of the runway longitudinally would enable one facility to serve both runway directions, such as shown in FIG. 4A. Alternately, locating the facility near the intersection of certain crossing runways may permit it to serve four runway directions, as shown in FIG. 4B. The single facility could also serve two parallel runways, as shown for example in FIG. 4C. Simultaneous operation on the parallel and crossing runways is possible, with the interrogations identifying the guidance for the different runways with different "channel/facility" codes.

Broad coverage angles of both azimuth and elevation are needed. Azimuth coverage of 360° is readily obtainable with three or more sided linear arrays or circular arrays 14, as shown in FIGS. 1 and 4A, 4B and 4C. The horizontal coverage angle of the elevation array can also be easily increased, with the time delay discriminant means, described above, limiting any normally expected increase in multi-path effects. The triangular azimuth array shown in FIG. 4A need not be equilateral. The accuracy requirements perpendicular to the runway, and resulting antenna aperture, need only be adequate for air traffic control and navigation purposes. Such an azimuth antenna also provides for any back azimuth requirement, as well as roll-out on the runway.

Another advantage of the system of the invention is exemplified in the configuration of FIG. 4C. In the embodiment of FIG. 4C, common facilities are shared by two parallel runways. The primary elevation site including the elevation antenna 13 is located, for example, in a conventional position about 1,000 feet from the threshold. A secondary elevation site, including an elevation antenna 13' is located approximately 3,000 feet from the threshold with the azimuth and interrogator facilities 10. Both elevation facilities provide data for flare height determination. The measured elevation angles from both sites are weighted in accordance to distance of the aircraft and suitably averaged. Such averaging can substantially reduce the peak ground multi-path errors, in particular in the most critical touchdown area.

As shown in FIG. 4C, the primary elevation facility has a broad coverage angle that permits side-looking and positions to the rear of the site. Precise measurements can be made at these short ranges. Having known aircraft distances from the sites permits compensation for any equivalent defocusing effects at short range. With the interferometer phase/amplitude measurements for this flare height being made at the early leading edge of the reply pulse, reflections from hangers or taxiing aircraft on the far side of the runways will have no effect, even if such reflections occur as close as 150 feet from the centerline, as discussed above.

The ground computational capability of the system of the invention can also provide other data correction and modifications before transmission to the aircraft. These corrections and modifications include, for example, conical-to-planar coordinate corrections on azimuth and elevation if desired, and course softening, or really, the more desired conversion from angle to lineal course displacements in the final approach region. This latter technique also provides a simple means for exact compensation for aircraft antenna-to-wheel height differences which have caused considerable problems with ILS, especially with very large aircraft.

Upon request from an aircraft, the ground facility may provide computed flare guidance for automatic landing of medium and small size civil and military aircraft. The system may also provide back-up flare or monitoring of flare for large aircraft. The initiating aircraft request would include speed, antenna height (above the wheels), and other necessary parameters. When the aircraft is less than 400 feet above the runway, for example, it reports air speed instead of altitude, with an appropriate code change. When the aircraft has reached the flare region, the elevation data is given in terms of deviation from the desired flare, typically controlling sink rate as a function of height. Utilizing, on alternate interrogations, the flare height function codes which are unused in the binary coded decimal height format, throttle control data may be transmitted to the aircraft for automatic throttle control, or for display and manual control. Thus, air speed and height may be controlled throughout the flare and touchdown as in the more sophisticated prior art systems, but without the need for complex avionic equipment.

The interrogator and the azimuth receiver which make up the ground sub-system 10 are shown in the functional block diagram of FIG. 5. The azimuth receiver system of FIG. 5 includes a receiver array 100 which receives and detects the radio frequency signals transmitted from the aircraft and received by the azimuth antenna array 14 of FIG. 1 and FIGS. 4A, 4B and 4C.

Several arrangements for the 360° azimuth array 14 are possible, including those shown in FIG. 4. But one may comprise two bi-directional linear arrays which are orthogonally located. One common center element 12, which is also connected to the interrogator section has omni-directional characteristics. The elements of each array may be themselves vertical arrays of about 5 λ (wavelengths) in order to discriminate against ground reflection effects. The elements are spaced horizontally in increasing steps of 2/1, starting with ½ λ. Thus, only seven elements, plus the common reference element, need be used for an array aperture of 32 λ. Different sizes and arrangements may be used for various applications.

With the foregoing form of antenna arrays, receiver array and control 100 would have 15 receivers. Conventional sample-and-hold quadrature outputs representing A sin $\phi$ and A cos $\phi$ of the received signal are provided by each receiver, the relative phase being determined with respect to the reference receiver. Simultaneous sampling is accomplished for the receiver array on the leading edge of the received pulse. An "instantaneous" automatic gain control is also commonly controlled.

The signals from the receivers are taken from respective sample-and-hold circuits. The analog-to-digital converter array 102 converts each of the sample-and-hold circuit signals into a digitally coded signal.

The digitally coded signals from the analog-to-digital converter array 102 are placed in the memory represented by block 104. This memory can be a common random access memory (RAM) and associated control circuitry for writing the digital signals into memory and for subsequently reading the digital signals out of memory. The decoded discrete address from decoder/parity check 120 is mated with the associated data in the memory. The memory serves as a storage for the digital signals until they can be unloaded into the angle processor 106, upon availability and request from the angle processor.

The angle processor 106 sequentially processes the digital data from memory 104. Two or more such angle processors in parallel may be used, if necessary, depending on the individual processors speed and the volume of traffic. The processor utilizes the relative phase measurements from each of the antenna elements of the array for the azimuth (or elevation) angle determination. The phase difference is first calculated for the pair of elements less than ½ wavelength (λ) in spacing. The phase difference ($\Delta \phi$), then, must be between +180° and −180°, and unambiguously identifies the wavefront direction ($\theta$) with the following relation:

$$\theta = \arcsin \frac{\Delta \phi}{360 \, D/\lambda},$$

where D is the spacing between the antenna array elements. The accuracy with this narrow spacing is low, but adequate to resolve the two ambiguous results an element spacing of one wavelength can produce. With such a spacing the phase difference could be between ±360°, beyond the ±180° unambiguous measurement capability. Thus, depending on the initial determination for $\theta$, 360° may be added to or subtracted from the phase angle $\Delta \phi$ for the second element spacing (D2) in order to obtain the same approximate value for $\theta$. Successively, this process is followed with the wider element spacings by adding or subtracting multiples of 360° to the measured relative phase angles in accordance with the increasing spacing D until the final value of $\Delta \phi$ is obtained for the widest element spacing. The greatest accuracy for the incident angle $\theta$ is obtained with this full spacing. As stated above, more sophisticated processing sequences have been developed in the prior art which also reduce multipath reflection errors. These processor algorithms, and operation of the elements 14, 100, 102 and 104, as well as 106, are described in detail in the Federal Republic of Germany proposal referred to above. It should also be noted that angle processor 106 also stores and utilizes phase error corrections for the receiver/antenna elements, as determined with pilot reference interrogation/replies, also described in this proposal.

The coordinate/offset computer 108 is a relatively common trigonometric computer of any appropriate design which responds to the measured azimuth angle and distance data and reported altitude for each aircraft to provide signals for each aircraft representing the latitude and longitude coordinates of the particular aircraft. Basic processing steps are:

(1) Compute the slant-range-corrected aircraft distance, b; this can take the form of $b = \sqrt{c^2 - a^2}$, or $b = c \cos(\arcsin a/c)$, where "c" is the slant range and "a" is the altitude of the aircraft above the ground station. (The known ground station elevation must be subtracted from the reported aircraft altitude for "a").

(2) Convert the "rho-theta", range and bearing measurements to cartesian coordinates, e (east/west) and n (north/south). The relations are: e = b sin P and n = b cos P, where b is the slant range corrected aircraft distance and P is the aircraft bearing from true north.

(3) Convert to differential lat./long. coordinates and add to known ground station lat./long. coordinates to obtain those of the aircraft.

Although various solution processing is possible, the following additional simplified steps may be used to provide distance and deviation from a pilot selected course into a waypoint, remote from the ground station.

(4) Subtract the aircraft lat./long. coordinates from those of the waypoint.

(5) Convert to cartesian distance coordinates (from waypoint).

(6) Convert coordinates to bearing (P) and distance (b) from waypoint (inverse of (2) above).

(7) Convert bearing from true to magnetic (P').

(8) Convert selected (in-bound magnetic) course (f) to its reciprocal (f').

(9) Subtract P' from f'.

(10) Compute lineal course deviation, D, from D = b sin (P' − f').

In the airport terminal area somewhat different computations may be made by computer 108. The following processing sequence is an example utilizing the azimuth, elevation and range measurements from an integrated ground facility (azimuth, elevation and interrogator equipment), located to the side of the runway at or near the normal elevation (glideslope) site.

(1) Compute the slant-range-corrected aircraft distance b, either as above using reported altitude, or, more precisely, with the relation b=c cos α, where c is the measured aircraft slant range and α is the measured conical elevation angle.

(2) Compute the aircraft coordinate distance (g) to the station parallel to the runway centerline, using g=b cos θ, where θ is the measured azimuth deviation angle of the aircraft with respect to the line parallel to the runway centerline. (Note that g becomes negative when the aircraft passes the station and θ becomes greater than 90°).

(3) Compute the (typically desired) aircraft distance (k) to the rollout end of the runway by adding g to the fixed distance J between the ground station and rollout end of the runway (parallel to the runway centerline).

(4) Compute the lateral displacement (D) of the aircraft from the runway centerline with D = ±t+b sin θ, where the sign of the station-to-runway centerline distance t is determined by the direction of azimuth deviation angle θ (left or right). (Note that this computation is for relatively short distances where lineal deviations from the centerline would be used.)

(5) At longer distances where the full-scale angular deviation would exceed the full-scale lineal deviation displayed to the pilot, the angular deviation (d) would be computed with the relation d=θ±arc sin t/b, where the sign of the arc sin angle is determined by whether the ground station is placed to the left or right side of the runway.

Computation by the coordinate/offset computer 108, or a similar but separate computer, for the elevation (glideslope) and flare functions must be made. It is assumed for this vertical guidance function that the ground station has been located adjacent to a point further down the runway from the GPIP (glidepath intercept point) by a distance of "u". One possible simplified computational sequence, utilizing some of the above parameters, is as follows:

(1) Computation of the aircraft height (h) above the runway is accomplished with the relation, h=s+c sin α, where s is the phase-center height of the elevation antenna above the runway.

(2) The conical elevation angle (v) of the aircraft with respect to the phantom GPIP on the runway centerline can be determined by the relation v=arc tan h/b', where the distance b', the slant-range corrected distance between the aircraft and the phantom GPIP, is determined by the relation b' = √(g−u)² + D².

(Note that planar elevation angles can also be determined with respect to the GPIP with somewhat different relations.)

(3) The glideslope deviation angle is w−v, where w is the desired glideslope angle.

(4) At shorter distances where the full-scale deviation angle becomes smaller than the desired full-scale lineal deviation, the latter is equal to y−h', where h' is the computed aircraft height h minus the wheels-to-antenna height (reported by the aircraft), and y is the desired aircraft wheels height as a function of the aircraft distance g along the centerline. This function would typically take the form, y=(g−u) tan W for values in the order of 50 feet and greater; below 50 feet it would be determined by the desired flare law, dependent on the glideslope angle, aircraft speed and other parameters, but not defined here.

Other parameter computations for different pulse function formats are also possible with software additions.

The aircraft file memory 110 can be a common random access memory (RAM) with associated control circuitry. This memory serves to store data concerning all aircraft interrogated by the system of the invention at any given time, including, for example, the identity of each aircraft, as well as its position, altitude, and so on.

The interrogator portion of the ground sub-system 10 includes a diplexer 112 which is interposed between a transmitter/modulator 114 and antenna 12, and which also couples the antenna to a receiver 116. The receiver is coupled to a block 118 which supplies range information to the coordinate/off-set computer 108. The range circuit 118 operates in a conventional manner; in this case initiation of the range timing is provided by interrogation programmer 124. The receiver 116 provides the precise reply pulse rise to conclude the timing, and the decoder/parity check 120, also operating on the receiver output, provides validation of the proper reply address. The decoder/parity check network 120 also supplies decoded signals to the blocks 104, 108 and 110 of the receiver system.

The decoder/parity check circuit 120 responds to the phase-coded pulses from receiver 116 to decode the pulses and to perform a parity check on the decoded pulses. The correct address is obtained in the decoded pulses as a result of the parity check only if the pulses are properly decoded. This circuit is known, and it is described, for example, in the "Electronic Engineers Handbook"—Fink, referred to above. The circuit is also described at Page 21 in the Federal Aviation Administration (FAA) report of Nov. 18, 1974, prepared by Lincoln Laboratory at the Massachusetts Institute of Technology entitled "DABS—A System Description".

Interrogation data to be sent to the aircraft is received from the aircraft file memory 110 sequentially by aircraft file number with the interrogation format code. Typically, the enroute structure format B (FIG. 3A) would be used, except that format A is used alternately with format B when requested by the aircraft. The data is encoded into the proper format by an encoder 122, including a parity check overlay on the discrete address, and the coded interrogation data is introduced to an interrogation programmer 124 for application to the transmitter/modulator 114. The interrogation programmer sequences the interrogations, utilizing the aircraft range data, with timing that will prevent the expected reply from overlapping replies from earlier interrogations. Messages for the interrogated aircraft, derived from the air traffic control system are also encoded by encoder 122 for transmission by the transmitter and have priority over normal interrogations. Auxiliary data derived from a block 126 is also introduced to the programmer 124 on a periodic basis for transmission to aircraft. Similar interrogation programming is utilized by DABS, as referred to above. The transmitter's phase-coded output pulse is fed through the diplexer 112 to the antenna.

The data is also communicated to the associated air traffic control center and other facilities. Depending on the speed of processor 106 and the amount of traffic, the total time for the reception and computation of the signal is of the order of 30 milliseconds.

If the ground station is a terminal area unit providing landing guidance, an elevation sub-system consisting of units 13 and 20 of FIG. 1 are included. The elevation antenna, of course, consists of a similar vertical instead of horizontal array, but the receiver sub-system is very similar to that of the azimuth consisting of blocks 100–108 of FIG. 5.

The airborne transponder 18 which is mounted in the individual aircraft is represented by the functional block diagram of FIG. 6. The transponder includes an antenna array 200 which is coupled through a diplexer 202 to a receiver 206 and to a transmitter/modulator 207. The receiver is coupled to decoder/parity check circuitry represented by the block 208 which is similar to circuit 120 in FIG. 5, and which in turn supplies an automatic gain control signal to the receiver. Block 208 is connected to azimuth and glideslope selectors, range and interface circuitry represented by the block 210, as well as to a collision avoidance processor 212.

The navigational interface circuitry includes digital-to-analog converters, DC amplifiers, and related circuitry, to interface the system of the invention with common navigational indicators and auto flight control equipment.

The collision avoidance processor 212 is relatively straightforward in its operation. As with Collision Avoidance System (CAS) processors (Federal Aviation Administration, Lincoln Laboratory, publication entitled "Beacon CAS (BCAS) An Integrated Air/Ground Collision Avoidance System", Mar. 23, 1976; and in FAA publication "The FAA Aircraft Separation Assurance Program" of September 1979), incoming data of other aircraft positions is first sorted for altitude. In a simplified form, all data is rejected except for those aircraft within, say, 2,000 feet of the subject aircraft. The lat./long. coordinates of any aircraft within this window are subtracted from the coordinates of the subject aircraft. The difference coordinates are polar converted into relative bearing and distance. Only those aircraft within, say, 20 miles are further processed. These aircraft can be directly displayed on an aircraft traffic environment display. This data is also stored with the aircraft identity (discrete address). With subsequent data on these aircraft, relative velocity vectors, for each are determined; these are projected to determine any collision threat, including altitude difference and changes. If a real threat exists, suitable vertical and/or horizontal escape maneuvers are determined and displayed.

The block 208 is further connected to a data display/controller circuit 214 which, in turn, is connected back to an encoder/reply delay circuit 216, the latter circuit being connected to the transmitter/modulator 207. The data display/controller 214 includes a keyboard which permits each aircraft to make requests of the ground station for certain specific information, for example, for area navigation data, this information being transmitted to and from the aircraft over the data link. The data display/controller also includes a display for displaying the information received from the ground station in response to the specific requests, or ground-initiated messages.

An altitude encoder 218 is connected to the block 216, and to the collision avoidance processor 212. The ground interrogation signal is received by the antenna 200, and is fed through the diplexer 202 to the receiver 206. The amplified video output of the receiver drives the decoder/parity check circuit 208 and its output is compared with the aircraft discrete address. If a proper output is confirmed, the range, azimuth elevation, echoed altitude, and/or other data are fed to the interface circuitry 210, as well as to the collision avoidance processor 212, and the data display/controller 214.

The decoder/parity check circuit 208 also provides the interrogation pulse leading edge thresholding for precisely timing the reply. The encoder/reply delay unit 216 encodes the reply pulse altitude and message data into proper format with the discrete aircraft address and parity overlay. At the end of the reply delay, which may be of the order of 120 microseconds, the encoded pulse train is triggered to the modulator of the transmitter/modulator 207, and is fed to the antenna 200 through diplexer 202. In this way, the power amplified, phase-coded reply pulse, as is shown in FIG. 3B, is fed through the diplexer 202 to the aircraft antenna 200.

The airborne transponder, responding to interrogations which have data defined by the Function Subframe, replies with specific data. Airborne requests are manually initiated, and become special replies (see Format B, FIG. 3B).

The circuitry of the various functional units of the systems of FIGS. 5 and 6 are in and of themselves well known, and a detailed description of the circuitry is believed to be unnecessary for the complete and accurate description of the system of the invention.

The functions provided by the system of the invention have been set forth briefly above. The five basic functions, as listed, are enroute and terminal area navigation, landing guidance, air traffic control surveillance, collision warning and avoidance, and data link. These five basic functions are discussed in some detail in the following paragraphs.

With respect to enroute and terminal area navigation, the system of the invention provides precise navigation for both terminal area and enroute flight. The navigational information is similar to that provided by the existing VORTAC facilities, except that the position errors of the system of the invention are reduced by more than an order of magnitude compared with those of the prior art.

The fact that the system of the invention is a ground derived system permits another navigational advantage, that of practical area navigation. That is, aircraft position data is available at the ground facility which permits off-set course guidance information to be computed and relayed to the aircraft. The guidance information is directly provided as conventional left-right deviation from the desired course into a waypoint remote from the ground station. The distance data is also with respect to the waypoint.

The pilot would select the waypoint by means of his data display/controller 214 (FIG. 6). This data could be entered in the form of latitude-longitude or in terms of one of the international 5-letter waypoing designators. The selected course to the waypoint would also be similarly entered. This data would be transmitted to the ground station 10 on the next reply and, after entry in the target aircraft file 110, would be repeated to the aircraft, for continuous display to the pilot, on the following interrogation. For at least half of the succeeding interrogations, the coordinate/off-set course computer 108 in the ground facility 10 (FIG. 5) computes distance to the waypoint and deviation from the desired course. When it is desired to take the most direct route to the waypint from the present position, an invalid course of, say, 480° is entered; the actual course is ground computed and relayed to the aircraft display. A unique function code is used for off-set course interrogations. The remaining interrogations transmit the normal latitude-longitude data for collision avoidance, up-dating of any on-board navigation equipment, etc. Such off-set courses could also be ground initiated for air traffic control (ATC) purposes.

A common problem for existing rho-theta navigation systems is that of slant-range errors. These errors are particularly troublesome for area navigation, and no universally acceptable solution has been found. Additional data (ground station elevation and aircraft altitude) and relatively expensive airborne computational circuitry is required in the prior art systems, or else course curvature and potential traffic conflicts will exist near the ground facility. The coordinate/off-set course computer 108 (FIG. 5) will provide slant range correction for all reply data prior to any surveillance or navigational usage. All positional information would then correlate geographically, and airborne equipment would have reduced requirements and cost.

The ground computational capability can further be used to provide vertical navigation (V-nav.). The reported altitude and measured distance are used to compute an artificial glideslope for enroute guidance of climbouts, letdowns, or other change-of-altitudes. Such guidance provides more precise predictions of traffic positions and resulting improvements in traffic control.

In the terminal area, the system of the invention provides both precise navigation and landing guidance, as well as the other stated functions. The precise distances required for the most stringent Cat. III approach (15 ft. 2 sigma accuracy for helicopter pad guidance) can be provided by the system of the invention along with the precise horizontal and vertical angular guidance. Moreover, the off-set course capability, described above, permits computation of the distances along the runway centerline with the facilities 10 and 20 (FIG. 1) located more conveniently than the normal azimuth and elevation sites. One such facility, by this means, can provide measurements for several runways at a given airport. The pilot selects the runway, and the facility 10 automatically provides the necessary off-set coordinates for its computation.

The off-set course capabilities of the system of the invention has further use for the initial approach. Guidance for complex STAR (Standard Terminal Area Route) or curved approaches is ground-provided without expensive, multi-waypoint airborne computers. The waypoint sequences (air or ground selected) are automatically programmed on the ground. Upon reaching one waypoint where a turn is started to the next waypoint, the new compass course is data-linked to the aircraft, providing the basic control information (in addition to left-right course deviation) needed for manual or automatic flight control. The final indicated course aligns the aircraft with the runway centerline, with the glideslope picked up as required.

The system of the invention supports and utilizes the discrete address beacon concept for air traffic surveillance purposes, and consequently provides all the required ATC data. The multi-channel system of the invention solves the traffic interference and related problems on the present-day single air traffic control radar beacon system (ATCRBS) channel, especially in high density terminal areas. A single common channel, however, appears most practical for the enroute facilities with overlapping coverage into the terminal areas.

Although several prior art aircraft collision warning-/avoidance systems have been tested with qualified success, there has been only limited action toward a national standard. A predominant reason has been the inability to show cost-effectiveness, or to pro-rate the user costs according to benefits. Another important reason has been the inability to assure operative equipment in all potential conflicting aircraft. Still another reason has been the unwillingness to accede to precipitous escape maneuvers in the presence of an appreciable false alarm rate common to most of the existing developmental systems.

The system of the invention provides precise aircraft position information and identification to all aircraft in a straightforward manner which can be easily interpreted for collision warning and avoidance. That is, the discretely addressed interrogations to an aircraft includes three-dimensional position data on that aircraft, which is used for navigation purposes; but this same positional data is received by other aircraft in the vicinity and related with respect to their own aircraft positions for collision avoidance. The latitude-longitude, and altitude data can be processed in a straightforward manner to determine relative position, velocity, etc. of potentially conflicting aircraft within the altitude window of interest. While the basic intent of the collision warning-/avoidance function of the system of the invention is to provide ground resolution of potential conflicts and data-link any escape maneuver instructions to the aircraft of concern, display of the above processed aircraft position data provides the pilot with monitoring means of his aircraft's traffic environment (including alerting means), and enables him to back up the system if exceptional situations should ever arise.

The principal uses of the data link function of the system of the invention were described in the previous paragraphs for navigation, landing guidance, ATC surveillance, and collision warning/avoidance functions. The data link is also available for other air traffic usage. All data link interrogations or replies are identified by unique function codes. All data-linked information is acknowledged with a repeat, whether ground or air initiated. Therefore, full assurance of proper information is provided before action is taken. Certain critical messages, or instructions, for collision avoidance, etc. may also be accompanied by a cockpit alerting signal. If any message or instructions of length are required, additional interrogations may be made so that there will be no undue loss in aircraft position data.

The data link can also be used for the equivalent of a supervisory control function. For example, upon transferring from one ATC center to another, a channel or facility change may be necessary. This could be accomplished by data-linking the new frequency or channel/facility code to the aircraft, having it acknowledged, and then automatically changing the airborne transponder unit 16 of FIGS. 1 and 6 to any new frequency.

The system of the invention can offer an economic solution to many such airport traffic control problems. The ground facilities 10 and 20 of FIG. 1 may provide approach navigation and landing guidance, but as importantly, they may also provide the necessary traffic surveillance in the terminal area and on the airport surface within the vicinity of the runways of concern. The facility 10 may transmit automated instructions to individual aircraft for their approach pattern (with suitable aircraft spacing), landing or take-off clearances, etc.; or by VHF communications an area ATC controller could provide necessary information and/or instructions using the system's traffic surveillance data. Thus, the system may provide the needed operational facilities of an automated airport tower. It provides these facilities with both non-recurring and recurring cost advantages compared to those of a control tower, while providing the basic safety and other benefits of tower operations.

The application of the system of the present invention to automated airport towers is in the sense that it provides the necessary surveillance, navigation, collision avoidance, landing guidance, and airport and meteorological (auxiliary) data, as well as a data communications link. An additional ground processor may be incorporated in the system, whose functions would include: (1) determination of active runway and approach pattern in use by means of wind and/or other data; (2) determination of suitable entrance into approach pattern, and communication of such clearance to requesting aircraft; (3) monitoring of aircraft in pattern to determine any potential conflicts, determination of any corrective action necessary (extension of base leg, etc.), and communication of such to the aircraft involved; (4) communicate landing clearance to the aircraft on final approach when the active runway has been cleared; (5) determine and communicate any "go around" instructions if irresolvable conflicts develop on final approach.

To sum up, therefore, with reference to FIG. 5, the "interrogation programmer" in conjunction with the "aircraft file memory" schedules all the aircraft interrogations. Typically, Format B interrogations would be used with these exceptions: (1) Format A when requested by the aircraft, alternating with Format B; (2) Format C for ground ATC or responses to air initiation requests; (3) Format D for terminal area facilities (landing guidance); (4) Format E for periodically transmitted auxiliary data to all aircraft. Similar interrogation program is utilized by the Discrete Address Beacon System (DABS), as described in various documents of the Federal Aviation Administration, including the report "DABS—A System Description", referred to above.

The airborne transponder basically responds to the ground interrogations with defined data replies. Requests are manually initiated, and become special replies (see Format B, FIG. 3B). Thus, no programming is required of the airborne transponder. The airborne transponder determines the interrogation format being received by the "Function" sub-frame. The airborne transponder decoder responds to interrogations with their own address and forward the positional data to the "navigational interface circuitry". Interrogations with other aircraft addresses are also received, but this positional data is forwarded to the "collision avoidance processor". Replies, of course, are only made to interrogations with the particular aircraft's address. Auxiliary data pulses have a general address for all aircraft, and defined by the "Function" sub-frame, and may have ground facility data and meteorological data.

With the discretely-addressed ground interrogations in the system of the invention, simultaneous reply signals do not occur. That is, the ground interrogations are so sequenced and spaced (utilizing range data) that the replies will always arrive in sequence, unlike ATCRBS and TACAN/DME, where air-to-ground pulses from different aircraft can overlap and be destructive to proper decoding. One exception is with initial entrance of an aircraft into the system; here it will transmit an identification pulse about once every one or two seconds until entered into the ground station aircraft file and interrogated. Here the probability of interfering with any particular aircraft is less than $10^{-4}$. However, if such an event should occur, or a similar loss of reply because of adverse propagation, the ground station would then reinterrogate the aircraft involved.

The invention provides, therefore, an improved air traffic control surveillance, navigation and landing guidance system which is capable of providing, in and of itself, all the required functions, thus obviating the need for a multiplicity of different systems for providing these functions. The system includes a collision warning system which utilizes ground derived three-dimensional aircraft position data and omnidirectionally transmitted, discretely addressed, position data on all aircraft in the area of concern, so that each aircraft may receive data to display its own complete traffic environment. The collision warning system can also provide ground-derived traffic analysis, computed three-dimensional aircraft escape maneuvers, and provide data link directives to the concerned aircraft. The collision warning system can also be used by aircraft operating outside the coverage zone of the ground facility to provide at least vertical escape maneuvers, by utilizing aircraft interrogations, as well as replies, in a similar manner to existing developmental systems.

The system of the invention may be incorporated into an implementation plan to take evolutional steps to provide a transition from existing TACAN/DME systems, associated VOR systems and ATCRBS systems to the system of the invention. In the transitional stage a combined co-channel ground terminal may be provided which compatibly provides interrogations in accordance with the system of the invention interspersed with conventional TACAN/DME pulse pairs. This may be achieved by transmitting the TACAN/DME pulse pairs approximately 9 dB higher in amplitude than the phase-coded pulses of the system of the invention. This in accordance with present-day standard procedures permits the airborne TACAN/DME interrogator decoders to discriminate against the latter pulses. This is because international standards require the decoders to reject interfering pulses which are 8 dB or more below the desired TACAN/DME pulses. Moreover, the decoders in the system of the invention will not respond to the higher level TACAN/DME pulses. Thus both systems may be used during the transitional period.

It will be appreciated that while a particular embodiment of the invention has been shown and described, modifications may be made. It is intended in the claims to cover the modifications which come within the spirit and scope of the invention.

I claim:

1. In combination: a ground station including a first transmitter for transmitting omnidirectionally discretely addressed code interrogation pulses to each of a plurality of aircraft in the vicinity of the ground station containing position data concerning each of the aircraft; a transponder mounted in each of the aircraft including a receiver for receiving and decoding coded interrogation pulses from the ground station, and including a second transmitter for transmitting appropriately timed coded reply pulses to the ground station containing altitude, discrete address, and other data concerning each of the aircraft; and a receiving system included in the ground station for measuring the incident angles and time delay of the reply pulses with respect to the interrogation pulses, computer means included in the receiving system for determining slant-range correction and for providing navigational data including the latitude/longitude coordinates of the aircraft in the vicinity of the ground station thereby to provide data at the ground station relating to the position of each aircraft for use at the ground station and for transmission to each of the aircraft by said first transmitter.

2. The combination defined in claim 1, in which said computer means provides three-dimensional positional data relating to all aircraft in the vicinity of the ground station for air traffic control purposes.

3. The combination defined in claim 1, in which said computer means provides data for retransmission to all of the aircraft by said first transmitter for navigation, landing guidance and collision avoidance purposes.

4. The combination defined in claim 1, and which includes means included in said ground station for forming a data link for auxiliary data between the ground station and all of the aircraft in the vicinity of the ground station.

5. The combination defined in claim 1, in which said ground station receiving system includes means for precisely timing below the 50% point on the leading edges of the interrogation pulses and the reply pulses for range purposes.

6. The combination defined in claim 1, in which said computer means provides latitude/longitude coordinates and upon request off-set course area navigation guidance data for transmission to the aircraft.

7. The combination defined in claim 1, in which said computer means provides three-dimensional landing guidance data for all aircraft from ground facilities which may have positions off-set with respect to the runway.

8. The combination defined in claim 1, in which said ground station receiving system includes interferometer antenna and receiver means with multi-path effects suppression processing responsive to the reply pulses for determining the bearing and elevation angles of each of the aircraft.

9. The combination defined in claim 1, in which the ground station includes a DME transponder for transmitting TACAN/DME reply pulse pairs at a higher amplitude than the aforesaid discretely addressed coded interrogation pulses, and in which said ground station includes a DME decoder which discriminates against the aforesaid discretely addressed coded reply pulses.

10. The combination defined in claim 9, in which the aircraft includes a DME interrogator in addition to said transponder, and selectable control circuitry for said DME interrogator and transponder.

11. In combination: a ground station including a first transmitter for transmitting omni-directionally discretely addressed code interrogation pulses to each of a plurality of aircraft in the vicinity of the ground station containing position data concerning each of the aircraft; a transponder mounted in each of the aircraft including a receiver for receiving and decoding coded interrogation pulses from the ground station, and including a second transmitter for transmitting appropriately timed coded reply pulses to the ground station containing altitude, discrete address, and other data concerning each of the aircraft; and a receiving system included in the ground station for measuring the incident angles and time delay of the reply pulses with respect to the interrogation pulses, computer means included in the receiving system for determining slant range correction and for providing navigational data including the coordinates of the aircraft in the vicinity of the ground station thereby to provide data at the ground station relating to the position of each aircraft for use at the ground station and for transmission to each of the aircraft by said first transmitter, in which said computer means provides data for forming three-dimensional position offsets for landing guidance of all of the aircraft, and said computer means further provides horizontal and vertical course softened data as the aircraft approaches a runway by converting from angular to lineal course deviations.

12. In combination: a ground station including a first transmitter for transmitting omni-directionally discretely addressed code interrogation pulses to each of a plurality of aircraft in the vicinity of the ground station containing position data concerning each of the aircraft; a transponder mounted in each of the aircraft including a receiver for receiving and decoding coded interrogation pulses from the ground station, and including a second transmitter for transmitting appropriately timed coded reply pulses to the ground station containing altitude and other data concerning each of the aircraft; and a receiving system included in the ground station for measuring the incident angles and time delay of the reply pulses with respect to the interrogation pulses, computer means included in the receiving system for determining slant-range correction and for providing navigational data including the coordinates of the aircraft in the vicinity of the ground station thereby to provide data at the ground station relating to the position of each aircraft for use at the ground station and for transmission to each of the aircraft by said first transmitter, in which said computer means provides automatic flare guidance in response to wheel-to-antenna height signals and other data signals received from the aircraft.

13. An aircraft surveillance and navigation system including: a ground station including an omni-directional antenna, an interrogator sub-system including a transmitter coupled to said omni-directional antenna for transmitting coded interrogation pulses discretely addressed to each of a plurality of aircraft in the vicinity of the ground station, an azimuth receiving interferometer antenna array for receiving signals from said plurality of aircraft, a receiver array coupled to the interferometer receiving antenna array for respectively receiving discretely addressed coded reply pulses from respective ones of said aircraft, means including an angle processor coupled to the receiver array and responsive to angular data signals from the respective individual receivers of the receiver array for computing the azimuth angle of each of the aircraft, means including a receiver coupled to said omni-directional antenna for measuring the timing between the leading edges of the interrogation pulses and the reply pulses of each of the aircraft, range circuitry coupled to said receiver and responsive to signals therefrom to determine the range of each of the aircraft, decoder circuitry coupled to said receiver for providing signals representative of the identification address and altitude of all of the aircraft and of other data of all of the aircraft, and a coordinate and off-set course computer responsive to azimuth angle signals from said angle processor, and to range signals from said range circuitry, and to altitude signals from said decoder circuitry, to provide slant-range corrected signals, latitude/longitude coordinate signals and off-set course deviation signals for all requesting aircraft; and a transponder located in each of the aircraft for receiving the coded interrogation pulses from the interrogator sub-system and for transmitting the coded reply pulses thereto.

14. The aircraft surveillance and navigation system defined in claim 13, and which includes an array of analog/digital converters coupled to said receiver array to provide angular data signals corresponding to each of the aircraft to the angle processor in digital form.

15. The aircraft surveillance and navigation system defined in claim 13, in which said ground station includes aircraft file memory means coupled to said coordinate and off-set computer, to said range circuitry, and to said decoder circuitry for storing data signals concerning all of the aircraft together with the associated discrete addresses of all of the aircraft to determine aircraft interrogation sequencing efficiently so as to space replies and avoid overlap, and to provide adequate data rate for all modes of operation.

16. The aircraft surveillance and navigation system defined in claim 15, and which includes encoder means coupled to said aircraft file memory and to said transmitter for causing the transmitter to transmit the interrogation pulses to all of the aircraft containing data stored in the aircraft file memory pertaining to a particular aircraft.

17. The aircraft surveillance and navigation system defined in claim 13, in which said transponder includes a transmitter and a receiver, altitude sensing means for producing signals indicative of the altitude of the aircraft, and encoder means coupled to the sensing means for producing altitude-coded pulses, including discrete addresses, and other data, for introducing such pulses to the last-named transmitter for transmission to the ground station.

18. An aircraft surveillance and navigation system including: a ground station including an omni-directional antenna, an interrogator sub-system including a first transmitter coupled to said omni-directional antenna for transmitting coded interrogation pulses discretely addressed to each of a plurality of aircraft in the vicinity of the ground station, an azimuth receiving antenna array for receiving signals from said plurality of aircraft, a receiver array coupled to the receiving antenna array for respectively receiving discretely addressed coded reply pulses from respective ones of said aircraft, means including an angle processor coupled to the receiver array for computing the azimuth angle of each of the aircraft, means including a receiver coupled to said omni-directional antenna for measuring the timing between the leading edges of the interrogation pulses and the reply pulses of each of the aircraft, range circuitry coupled to said receiver and responsive to signals therefrom to determine the range of each of the aircraft, decoder circuitry coupled to said receiver for providing signals representative of the identification address and altitude of all of the aircraft and of other data of all of the aircraft, and a coordinate and off-set course computer responsive to azimuth angle signals from said angle processor, and to range signals from said range circuitry, and to altitude signals from said decoder circuitry, to provide slant-range corrected signals, position coordinate signals and off-set course deviation signals for all requesting aircraft; and a transponder located in each of the aircraft for receiving the coded interrogation pulses from the interrogator sub-system and for transmitting coded pulses thereto, said transponder including a second transmitter and a second receiver, altitude sensing means for producing signals indicative of the altitude of the aircraft, and encoder means coupled to the sensing means for producing altitude-coded pulses and for introducing such pulses to said second transmitter for transmission to the ground signal, and which includes decoding means coupled to said second receiver for producing signals representative of the latitude, longitude and altitude of all of the aircraft.

19. The aircraft surveillance and navigation system defined in claim 18, in which said transponder further includes collision avoidance processing means coupled to said last-named decoding means.

20. The aircraft surveillance and navigation system defined in claim 18, in which said ground station further includes an elevation receiving antenna array, a receiver array coupled to the elevation receiving antenna array for producing signals representative of the elevation angle of the aircraft, and computer means for determining the altitude of each of the aircraft independent of any reported altitude.

21. The aircraft surveillance and navigation system defined in claim 18, and which includes elevation angle and flare measuring stations for providing flare guidance for the aircraft with respect to one or more runways.

22. The aircraft surveillance and navigation system defined in claim 21, in which the ground station and the elevation angle and flare measuring stations are positioned adjacent to one or more runways, and the elevation angle and flare measuring stations are displaced from the ground station along the runway by a predetermined distance.

23. The aircraft surveillance and navigation system defined in claim 18, and which includes an elevation angle or flare measuring station integrated with said ground station and serving to provide flare guidance for the aircraft with respect to one or more runways.

24. The aircraft surveillance and navigation system defined in claim 18, and which includes a primary elevation angle and flare measuring station and a secondary elevation angle and flare measuring station, said secondary elevation angle and flare measuring station being integrated with said ground station and located adjacent to one or more runways, and said primary elevation angle and flare measuring station being displaced from said secondary elevation angle and flare measuring station along the runway, and both said primary elevation angle and flare measuring station and said secondary elevation angle and flare measuring station providing flare guidance for the aircraft with respect to one or more runways.

25. The aircraft surveillance and navigation system defined in claim 18, in which said ground station includes a computer for providing the aircraft with course data and distance data with respect to particular waypoints, and each aircraft includes a controller for enabling the pilot to enter selected course and waypoint coordinate date into the computer by means of an extended reply pulse.

26. The aircraft surveillance and navigation system defined in claim 18, in which the coded interrogation pulses include function and channel/facility sub-frames.

* * * * *